US010782662B2

(12) United States Patent
Doh et al.

(10) Patent No.: US 10,782,662 B2
(45) Date of Patent: Sep. 22, 2020

(54) APPARATUS AND METHOD FOR ENERGY SAFETY MANAGEMENT

(71) Applicant: ELECTRONICS AND TELECOMMUNICATIONS RESEARCH INSTITUTE, Daejeon (KR)

(72) Inventors: Yoon Mee Doh, Daejeon (KR); Eun Ju Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 14 days.

(21) Appl. No.: 15/977,029

(22) Filed: May 11, 2018

(65) Prior Publication Data
US 2018/0329381 A1    Nov. 15, 2018

(30) Foreign Application Priority Data
May 11, 2017    (KR) .................. 10-2017-0058594

(51) Int. Cl.
*G05B 19/042*    (2006.01)
(52) U.S. Cl.
CPC ....... *G05B 19/042* (2013.01); *G05B 19/0428* (2013.01); *G05B 2219/2639* (2013.01)
(58) Field of Classification Search
CPC .............. G05B 19/042; G05B 19/0428; G05B 2219/2639
See application file for complete search history.

(56) References Cited

U.S. PATENT DOCUMENTS

| 9,613,521 | B2 * | 4/2017 | Hunter | .................. G09F 27/00 |
| 2013/0245863 | A1 * | 9/2013 | Frazier | .................... B61C 3/00 |
| | | | | 701/19 |
| 2017/0012309 | A1 * | 1/2017 | Venkat | .............. H01M 8/04664 |
| 2018/0093568 | A1 * | 4/2018 | Park | .................. G01R 31/3842 |

FOREIGN PATENT DOCUMENTS

| CN | 105958480 A  * | 9/2016 |
| KR | 10-0755955 B1 | 9/2007 |
| KR | 10-2011-0059683 A | 6/2011 |
| KR | 10-2016-0027389 A | 3/2016 |

* cited by examiner

*Primary Examiner* — Thomas C Lee
*Assistant Examiner* — Anzuman Sharmin
(74) *Attorney, Agent, or Firm* — LRK Patent Law Firm (57) ABSTRACT

A central safety management apparatus includes a safety management unit collecting safety management policies and regulations for each energy source and calculating operation criteria for each energy source; an accident precursor analysis unit collecting accident event related information of each energy source from a plurality of energy source safety management apparatuses managing different energy sources and analyzing occurrence possibility of safety accidents in advance based on the accident event related information and the operation criteria; and a safety enforcement unit transmitting a result of the analysis of the accident precursor analysis unit to the plurality of energy source safety management apparatuses.

17 Claims, 7 Drawing Sheets

APPARATUS AND METHOD FOR ENERGY SAFETY MANAGEMENT

CROSS-REFERENCE TO RELATED APPLICATION(S)

This application claims priority to Korean Patent Application No. 10-2017-0058594, filed on May 11, 2017 in the Korean Intellectual Property Office (KIPO), the entire content of which is hereby incorporated by reference.

BACKGROUND

1. Technical Field

The present disclosure relates to an apparatus and a method for energy safety management, and more specifically, to an apparatus and a method for energy safety management which prevent fusion safety accidents of different energy sources as well as safety accidents of a single energy source.

2. Description of Related Art

In our life, electric energy is used for the convenience of modern society because it is relatively easy to be converted to other forms of energy. However, electricity is a serious factor that accounts for 30% of the total fire, and, may cause electrical fires by acting as an ignition source such as short circuit, overload, contact failure, electric leakage, electric spark, or the like.

The short circuit may occur when an insulator is destroyed or deteriorated, and a spark may be generated according to the short circuit, so that surrounding flammable material may be ignited. Also, when the overload occurs, an excessive current may flow through an electric wire, heat may be generated, the coating of the electric wire may be damaged in succession, and an arc may be generated to cause an electrical fire. Such the overload may be mainly caused by cable aging or increase in load capacity. The increase in load capacity may generate heat, and an electrical fire may follow the same process as overloading. The increase in load capacity may be attributed to insertion of too many plugs into an outlet at once. The electric leakage is a phenomenon in which a current flows in a place other than a conductor, and an electrical fire may occur when a combustible object exists in the current path. Such the leakage may also be caused by deterioration of the insulator. Therefore, it is necessary to periodically measure and repair the insulator in order to prevent the electrical fire caused by the electric leakage. Also, an electric spark may occur when a switch is opened or closed, and a fire may occur if such an electric spark touches the ignitable material. Also, the electric spark may occur when a switch is opened or closed, and an electrical fire may occur if such the electric spark touches the flammable material.

More than 70% of the electrical fires may be caused by arc. Currently, earth leakage breakers of most houses have only functions of preventing electric shocks, but they do not have functions to prevent the electrical fires. Also, arc breakers are mainly installed on distribution boards. Therefore, leakage break by individual facilities are required.

The electric energy may act not only as a source of fire but also as an ignition source of explosion. In an environment where electric equipment and gas equipment are installed together, the ignition source of explosion may be a spark of electricity which causes gas explosion when gas is leaked. Especially, since the ignition source of explosion inside a plant and the cause of fire are occupied by electricity at a rate of 17%, electricity, which is the ignition source, should be managed. Also, if an electrical disaster occurs, it may lead to additional gas disasters, and secondary disasters caused by the gas may lead to greater disasters. However, in the past, each energy source has been independently managed without considering this.

On the other hand, according to development of technologies such as sensor networks and Internet of Things (IOT), these technologies are being used also in the field of safety management. In the conventional sensor networks and IoT, generally, data may be collected from sensors to determine a situation, and control signals may be transmitted to actuators through control commands to cope with the determined situation. Thus, it is necessary to transfer the data according to appropriate sensing, store the data, and determine the situation.

However, since most safety accidents are imminent, there may be cases where the above-described series of processes are inappropriate to cope with the safety accidents. Therefore, in the field of safety management, a management apparatus capable of coping with such the imminent safety accidents is required.

SUMMARY

Accordingly, embodiments of the present disclosure provide a fusion safety management method using direct information exchange between different energy source safety management apparatuses before information exchange with a central safety management apparatus.

Accordingly, embodiments of the present disclosure also provide a central safety management apparatus which establishes operation criteria according to safety management policies and regulations for respective energy sources, collects accident event related information of the respective energy sources, and performs pre-analysis on occurrence possibility of safety accidents based on the accident event related information and the operation criteria.

Accordingly, embodiments of the present disclosure also provide an energy source safety management apparatus which determines whether a safety accident occurs based on sensing data of an energy source and accident event related information of other energy sources, and transmits a result of the determination to other energy source safety management apparatuses.

Accordingly, embodiments of the present disclosure also provide a method of determining whether a first accident event occurs based on sensing data of a first energy source, transmitting information related to the first accident event to other energy source safety management apparatuses, and receiving information related to a second accident event from the other energy source safety management apparatuses.

In order to achieve the objective of the present disclosure, a central safety management apparatus may comprise a safety management unit collecting safety management policies and regulations for each energy source and establishing operation criteria for each energy source; an accident precursor analysis unit collecting accident event related information of each energy source from a plurality of energy source safety management apparatuses managing different energy sources, and analyzing occurrence possibility of safety accidents in advance based on the accident event related information and the operation criteria; and a safety enforcement unit transmitting a result of the analysis of the accident precursor analysis unit to the plurality of energy source safety management apparatuses.

The central safety management apparatus may further comprise an external interoperation unit collecting data related to facilities of respective energy sources, weather data of places where the respective facilities are located, user data of the respective facilities, and accident histories of the respective facilities, and providing the collected data to the accident precursor analysis unit.

The accident event related information may include at least one of sensing data of an energy source and information on whether an accident event occurs.

The operation criteria may include at least one of sensing reference values for energy sources and control reference values for energy sources.

The operation criteria may include at least one of a plurality of factors used for determining an occurrence of a safety accident and a plurality of factors used for determining an occurrence of a fusion safety accident involving different energy sources.

The accident precursor analysis unit may calculate at least one of a time to prepare for a safety accident or a time to cope with a safety accident according to a type of a safety accident for each energy source.

The safety enforcement unit may transmit the time calculated by the accident precursor analysis unit to the plurality of energy source safety management apparatuses.

In order to achieve the objective of the present disclosure, an energy source safety management apparatus may comprise a sensing unit determining whether an accident event occurs based on sensing data collected from a sensor of an energy source; a control unit transmitting accident event related information to other energy source safety management apparatuses; and a reporting unit transmitting the accident event related information to a central safety management apparatus.

The accident event related information may include at least one of the sensing data and information on whether an accident event occurs.

The sensing unit may receive accident event related information of the other energy source safety management apparatuses from the other energy source safety management apparatuses, and determine whether a fusion safety accident occurs based on the sensing data and the accident event related information of the other energy source safety management apparatuses.

The accident event related information of the other energy source safety management apparatuses may include at least one of sensing data of the other energy source safety management apparatuses and information on whether an accident event occurs in the other energy source safety management apparatuses.

The control unit may transmit control signals to an actuator of the energy source based on a result of the determination of the sensing unit.

In order to achieve the objective of the present disclosure, an energy source safety management method may comprise determining whether a first accident event occurs based on first sensing data collected from a plurality of sensor for a first energy source; transmitting information related to the first accident event to a second energy source safety management apparatus; and receiving information related to a second accident event from the second energy source safety management apparatus.

The information related to the first accident event may include at least one of the first sensing data and information on whether the first accident event occurs.

The energy source safety management method may further comprise transmitting control signals to an actuator according to whether the first accident event occurs; and transmitting the information related to the first accident event to a central safety management apparatus.

The information related to the second accident event may include at least one of second sensing data of the second energy source safety management apparatus and information on whether the second accident event occurs in the second energy source safety management apparatus.

The energy source safety management method may further comprise determining whether a fusion safety accident event occurs based on the information related to the first accident event and the information related to the second accident event.

The energy source safety management method may further comprise transmitting control signals to an actuator according to whether the fusion safety accident event occurs; and transmitting information on whether the fusion safety accident event occurs to a central safety management apparatus.

The energy source safety management method may further comprise receiving, from the central safety management apparatus, information on occurrence possibility of safety accidents obtained through analysis on received information using operation criteria established according to management policies and regulation for respective energy sources.

The energy source safety management method may further comprise receiving at least one of a time to prepare for a safety accident and a time to cope with a safety accident from the central safety management apparatus.

According to the embodiments of the present disclosure, since direct information exchange between the energy source safety management apparatuses of a plurality of different energy sources is performed before exchanging information with the central safety management apparatus, it is made possible to promptly cope with imminent safety accidents.

Also, since each energy source safety management apparatus performs quick action and reports it to the central safety management apparatus, it is made possible to provide a safety management system for reporting after pre-treatment that can cope with the urgency of safety management.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings.

Figure 1:
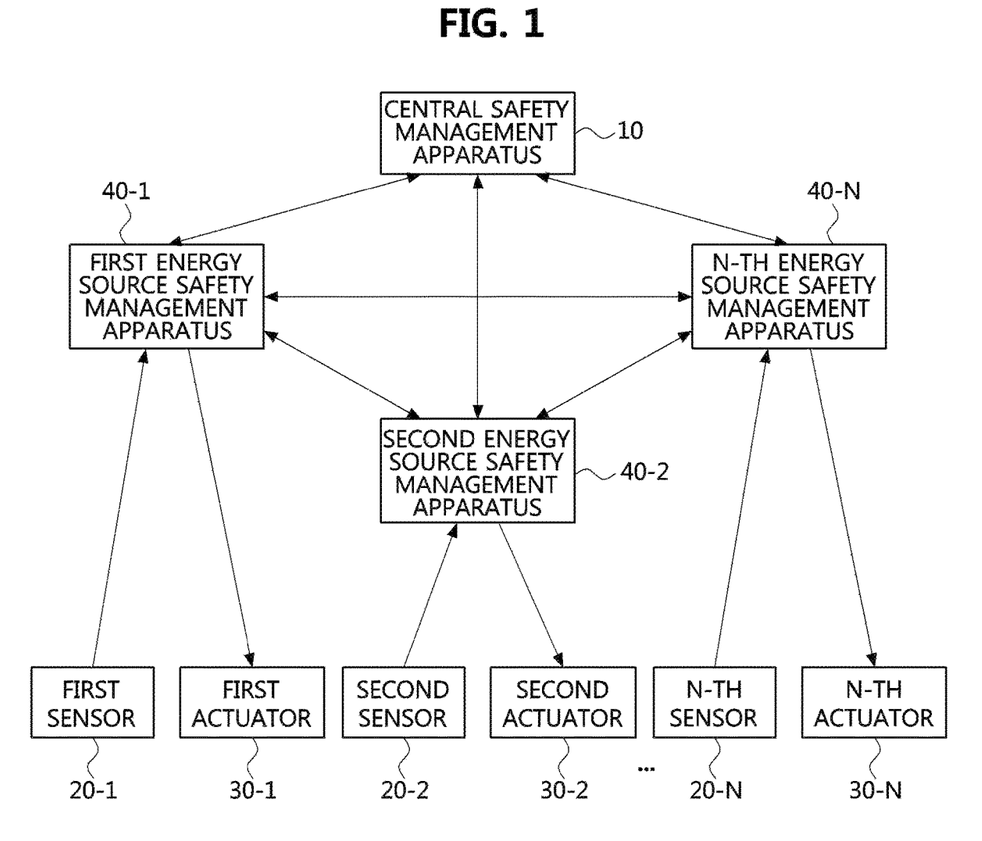
FIG. 1 is a block diagram of a safety management system according to an embodiment of the present disclosure.

FIG. 1 is a block diagram of a safety management system according to an embodiment of the present disclosure.

Referring to FIG. 1, a safety management system according to an embodiment of the present disclosure may comprise a central safety management (CSM) apparatus 10 and first to N-th energy source safety management (ESSM) apparatuses 40-1, 40-2, ..., and 40-N. FIG. 1 illustrates connection relationship between them. Here, N is a natural number of 2 or more, and N represents the same meaning through the present specification.

Each (e.g., 40-1) of the ESSM apparatuses may be connected to the other ESSM apparatuses (e.g., 40-2, 40-3, ..., and 40-N) and the CSM apparatus 10. Also, each of the ESSM apparatuses 40-1, 40-2, ..., and 40-N may be connected to each of sensors 20-1, 20-2, ..., 20-N and each of actuators 30-1, 30-2, ..., and 30-N capable of changing a state of corresponding energy source.

Here, the energy sources may be energy sources needed for operations of facilities in a residential area, a commercial area, an industrial area, etc., and may include energy sources such as electricity, gas, water heat source and smart grid renewable energy. Also, the actuators 30-1, 30-2, ..., and 30-N may be operated by electric energy.

The CSM apparatus 10 may collect big data about policies and regulations or information on energy sources from the outside, receive accident event related information from the respective ESSM apparatuses 40-1, 40-2, ..., and 40-N, and analyze and react to safety accidents. A further detailed description will be given later with reference to FIG. 2.

Also, each of the ESSM apparatuses 40-1, 40-2, ..., and 40-N may collect sensing data from the respective sensors 20-1, 20-2, ..., and 20-N, analyze the collected sensing data, transmit control signals to the actuators 30-1, 30-2, ..., and 30-N of the respective ESSM apparatuses 40-1, 40-2, ..., and 40-N, and transmit accident event related information to the CSM apparatus 10. A further detailed description will be given later with reference to FIG. 3.

Figure 2:
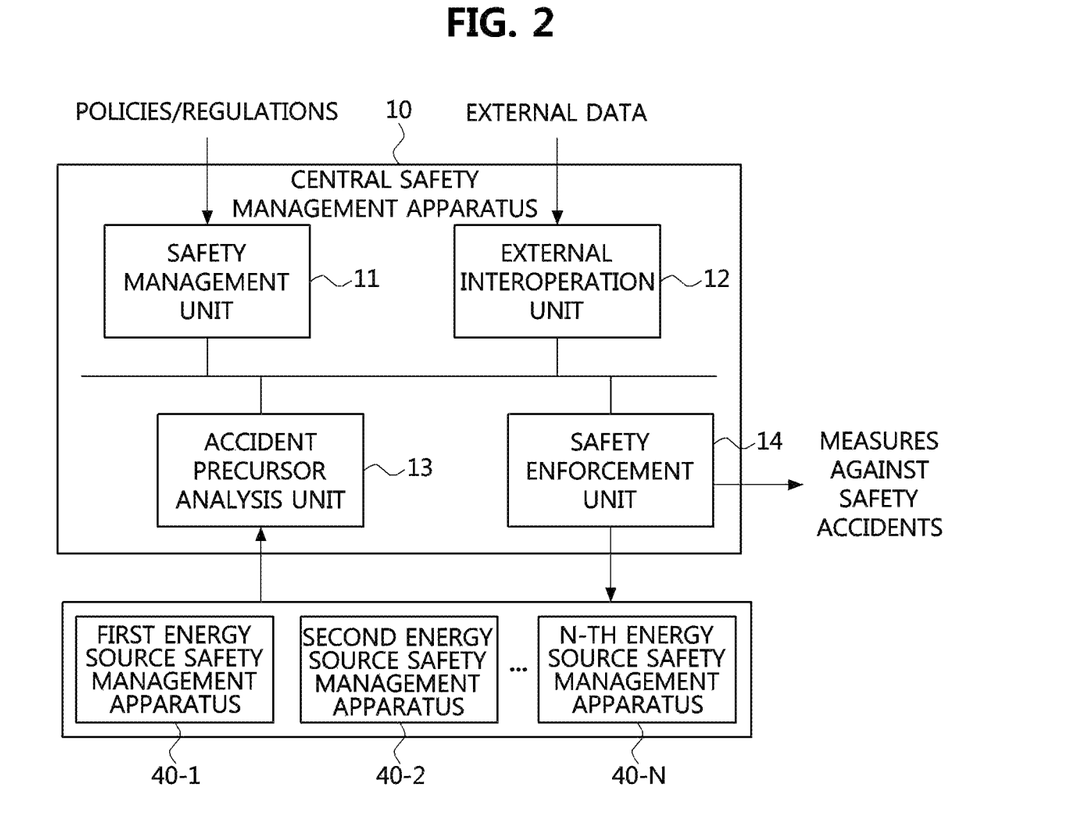
FIG. 2 is a block diagram of a central safety management apparatus according to an embodiment of the present disclosure.

FIG. 2 is a block diagram of a central safety management apparatus according to an embodiment of the present disclosure.

Referring to FIG. 2, the CSM apparatus 10 according to an embodiment of the present disclosure may comprise a safety management unit 11, an external interoperation unit 12, an accident precursor analysis unit 13, and a safety enforcement unit 14. The components of the CSM apparatus 10 may be connected through a common bus, but the embodiment of the present disclosure is not limited thereto.

The safety management unit 11 may collect safety management policies and regulations from outside and establish operation criteria used for determining an occurrence of a safety accident for each energy source managed by each of the ESSM apparatuses 40-1, 40-2, ..., and 40-N. Here, the operation criteria may include information on sensing reference values and control reference values for each energy source. Also, the operation criteria may include a plurality of factors, threshold values of the plurality of factors, and a complex relationship between the plurality of factors, which can be used for determining an occurrence of a safety accident for each of the energy sources. Also, the operation criteria may include a plurality of factors which can be used for determining an occurrence of a fusion safety accident involving different energy sources.

The external interoperation unit 12 may collect data related to facilities of each energy source, weather data of places where the respective facilities are located, user data of the respective facilities, and accident histories of the respective facilities. The data to be collected may be configured differently according to each energy source requirement. Also, if necessary, it is possible to analyze occurrence possibility of safety accidents by using a big data engine based on the collected data.

The accident precursor analysis unit 13 may collect accident event related information from the ESSM apparatuses 40-1, 40-2, . . . , and 40-N each of which exists independently for each energy source. Alternatively, the accident precursor analysis unit 13 may exist independently for each energy source and collect accident event related information from each of the ESSM apparatuses 40-1, 40-2, . . . , and 40-N. The accident event related information may include sensing data measured by the sensors 20-1, 20-2, . . . , and 20-N of the respective energy sources and energy source accident events determined by the respective ESSM apparatuses 40-1, 40-2, . . . , and 40-N.

The accident precursor analysis unit 13 may predict an occurrence probability of a safety accident involving a single energy source and an occurrence probability of a fusion safety accident involving different energy sources according to the operation criteria established by the safety management unit 11 based on the collected accident event related information. Also, the accident precursor analysis unit 13 may calculate a time (e.g., golden hour) required to cope with a predicted safety accident or a time required to prepare for the predicted safety accident according to the type of the safety accident. A further detailed description will be given later with reference to FIG. 7.

The accident precursor analysis unit 13 may be included in the CSM apparatus 10, but may be included in each of at least one ESSM apparatus. When the accident precursor analysis unit 13 is included in the ESSM apparatus, the accident precursor analysis unit 13 may perform its functions based on information such as the sensing data value of management subject area, an operation standard, and event related information received from other ESSM apparatus.

The safety enforcement unit 14 may transmit the analysis result of the accident precursor analysis unit 13 and the occurrence possibility of safety accident including at least one of the time required to cope with the predicted safety accident and the time required to prepare for the predicted safety accident to the respective ESSN apparatuses 40-1, 40-2, . . . , and 40-N, and the respective ESSM apparatuses 40-1, 40-2, . . . , and 40-N may prevent the occurrence of the safety accident by operating the actuators based on the received information. Also, the safety enforcement unit 14 may take measures against the predicted safety accidents. Here, the measures may include at least one of control of blocking at least one energy source related to the predicted safety accident, call of a person in charge of safety management, issue of an alarm for emergency situation propagation, but the embodiment of the present disclosure is not limited thereto.

Figure 3:
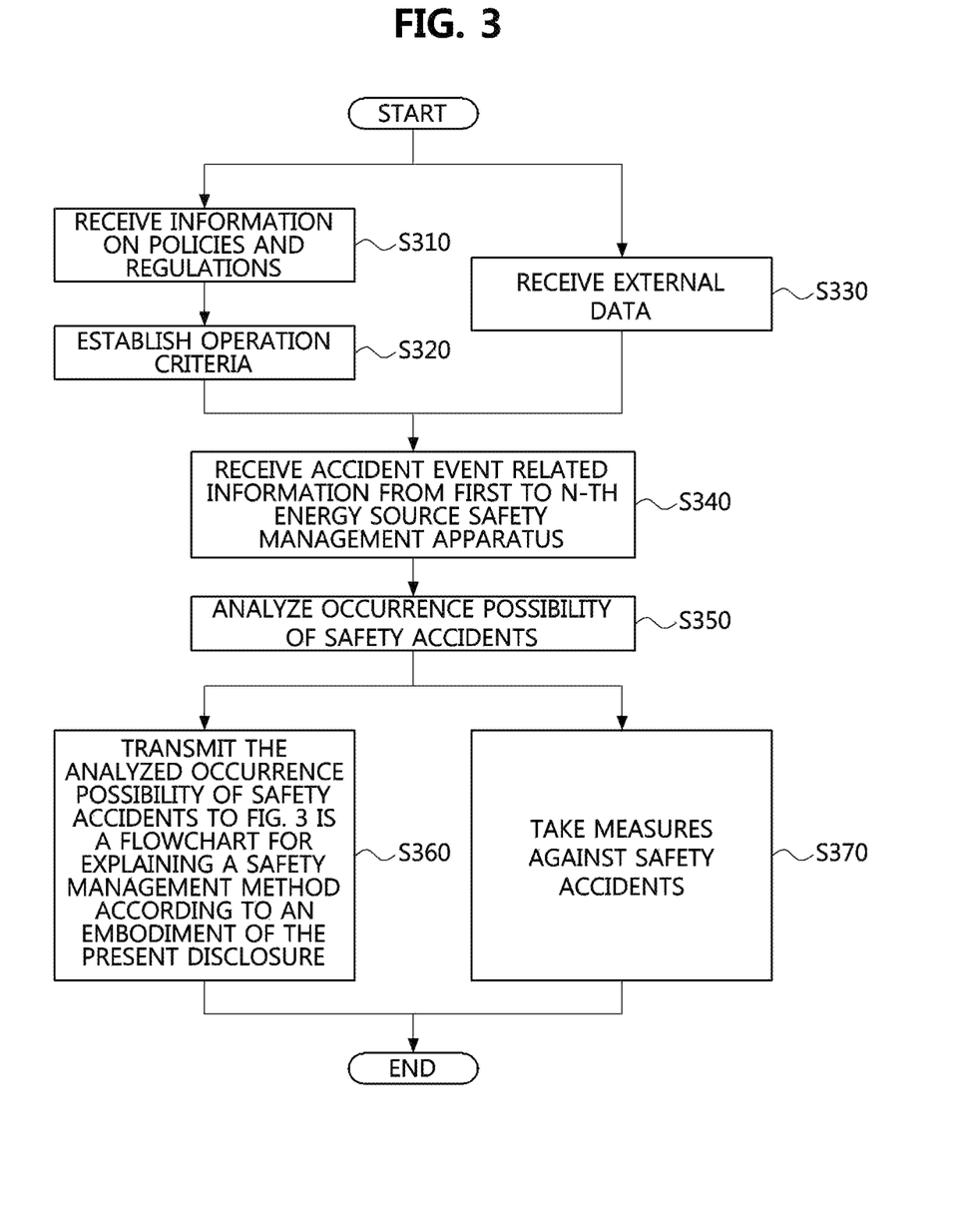
FIG. 3 is a flowchart for explaining a safety management method according to an embodiment of the present disclosure.

FIG. 3 is a flowchart for explaining a safety management method according to an embodiment of the present disclosure.

The safety management method illustrated in FIG. 3 may be performed by the CSM apparatus 10, but the entity performing the method is not limited thereto. Hereinafter, an operation sequence of the CSM apparatus according to an embodiment of the present disclosure will be described with reference to FIG. 3.

The CSM apparatus 10 may collect safety management policies and regulations via the safety management unit 11 (S310), establish operation criteria for each energy source (S320), and collect external data via the external interoperation unit 12 (S330). Then, the CSM apparatus 10 may receive accident event related information from the respective ESSM apparatuses 40-1, 40-2, . . . , and 40-N (S340), and analyze occurrence possibilities of safety accidents based on the received accident event related information and external data and the established operation criteria (S350). Also, after the analysis, the CSM apparatus 10 may transmit information on the analyzed occurrence possibilities of safety accidents to the respective ESSM apparatuses 40-1, 40-2, . . . , and 40-N (S360), and take measures against the predicted occurrence of the safety accidents (S370).

Figure 4:
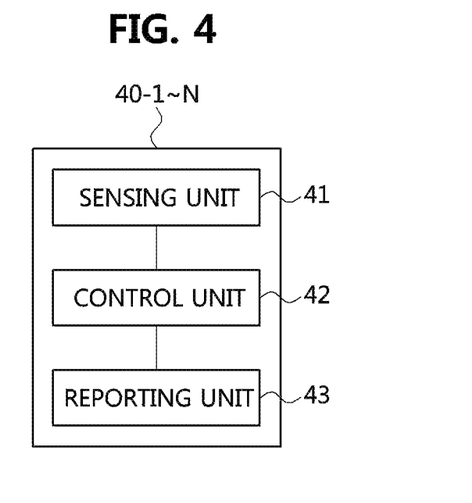
FIG. 4 is a block diagram of an energy source safety management apparatus according to an embodiment of the present disclosure.

FIG. 4 is a block diagram of an energy source safety management apparatus according to an embodiment of the present disclosure.

Referring to FIG. 4, each ESSM apparatus according to an embodiment of the present disclosure may comprise a sensing unit 41, a control unit 42, and a reporting unit 43, but the embodiment of the present disclosure is not limited thereto. Also, the below description is for the first ESSM apparatus 40-1, the other ESSM apparatuses 40-2, 40-3, . . . , and 40-N may have the same structure with the first ESSM apparatus 40-1, and thus description thereof will be omitted.

The sensing unit 41 of the first ESSM apparatus 40-1 may collect sensing data measured by the first sensor 20-1 corresponding to the first energy source, and determine whether or not an accident event of the first energy source is to occur based on the information about the occurrence possibility of safety accident previously received from the CSM apparatus 10 and the collected sensing data.

For example, when the first energy source is electrical energy, the sensing data may include information on current leakage, electrostatic charge, overcurrent, overload, arc, smoke, flame, r high-temperature which a known as decisive causes of electrical safety accidents or estimated to be causes of electrical safety accidents. Also, when the first energy source is gas, the sensing data play include information on gas leakage, air volume, humidity, smoke, flame, or high-temperature which are known as decisive causes of gas safety accidents or estimated to be causes of gas safety accidents.

Here, the information on the occurrence possibility of safety accident may be information, generated based on the accident event related information transmitted by the respective ESSM apparatuses to the CSM apparatus 10, and may be advance feedback information.

Also, the sensing unit 41 may receive accident event related information including at least one of information on whether an accident event occurs in the other energy sources and sensing data of the other energy sources from the other ESSM apparatuses 40-2, 40-3, . . . , and 40-N. Then, the sensing unit 41 may determine whether a fusion safety accident occurs or not based on the received accident event related information received from the other ESSM apparatuses, the sensing data measured by the first sensor 20-1, and the occurrence possibility of safety accident received from the CSM apparatus 10.

When an accident event or a fusion safety accident event occurs according to the determination of the sensing unit 41, the control unit 42 may transmit control signals to the actuator 30-1 of the first energy source, and transmit, to the other ESSM apparatuses 40-2, 40-3 . . . , and 40-N accident event related information or fusion safety accident event related information including at least one of the information on whether an accident event occurs and the sensing data measured by the first sensor.

Hereafter, operations of the second ESSM apparatus 40-2 that has received the accident event related information of the first ESSM apparatus 40-1 will be described. However, the other ESSM apparatuses 40-3, 40-4, ..., and 40-N may operate in the same manner.

The sensing unit 41 of the second ESSM apparatus 40-2 may receive the accident event related information transmitted from the control unit 42 of the first ESSM apparatus 40-1, and determine whether a fusion safety accident event occurs or not based on the received accident event related information, sensing data of the second energy source, and the occurrence possibility of safety accident received from the CSM apparatus 10. When the sensing unit 41 of the second ESSM apparatus 40-2 determines that the fusion safety accident event occurs, the control unit 42 of the second ESSM apparatus 40-2 may transmit control signals to the second actuator, and transmit information related to the fusion safety accident to the other ESSM apparatuses 40-1, 40-3, 40-4, ..., and 40-N.

After the control unit 42 transmits the control signals and the accident event related information (and/or the fusion safety accident event related information), the reporting unit 43 may transmit, to the CSM apparatus 10, accident event occurrence related information (including the fusion safety accident event related information) including at least one of information on the accident event and the sensing data.

Figure 5:
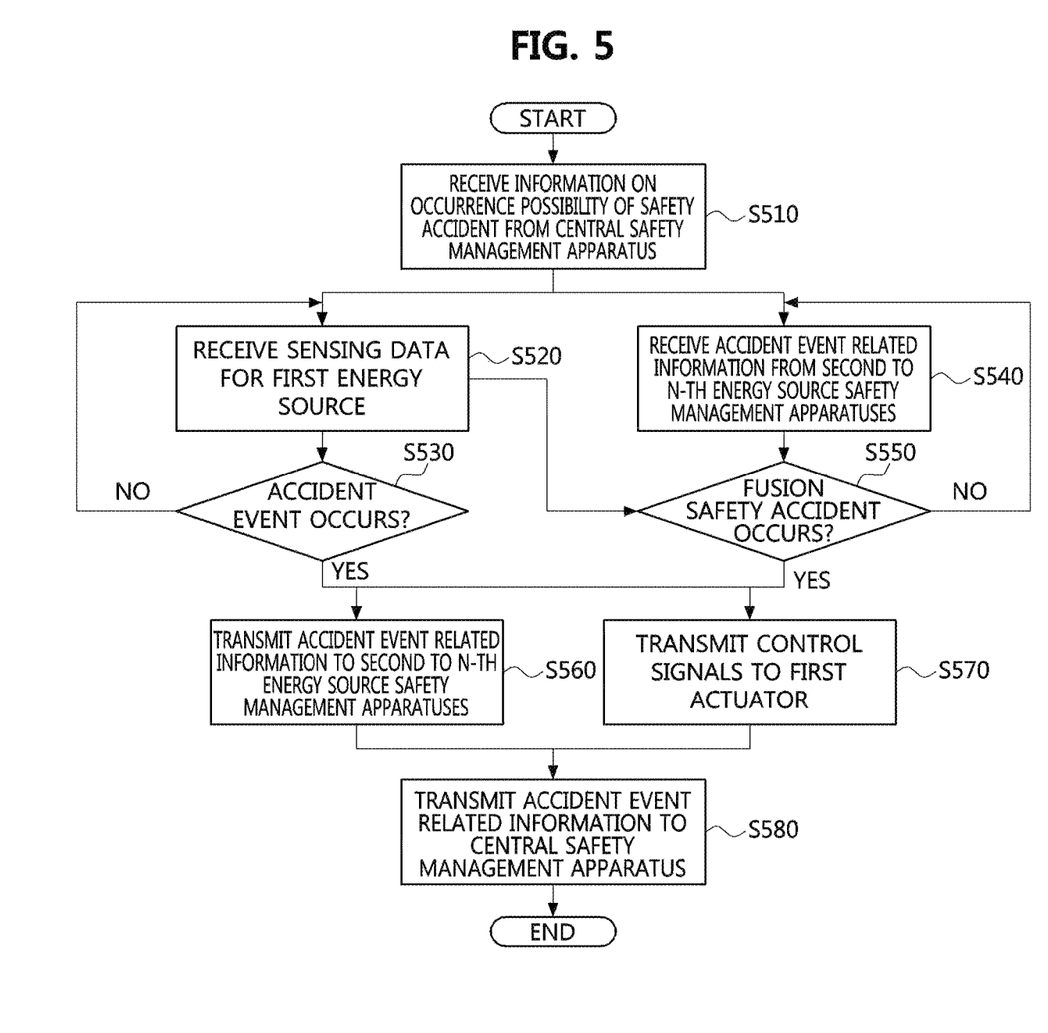
FIG. 5 is a flowchart for explaining an energy source safety management method according to another embodiment of the present disclosure.

FIG. 5 is a flowchart for explaining an energy source safety management method according to another embodiment of the present disclosure.

The energy safety management method according to another embodiment of the present disclosure will be described with reference to FIG. 5, for example, assuming that the method is performed according to the operation sequence of the first ESSM apparatus 40-1.

The first ESSM apparatus 40-1 may receive information on the occurrence possibility of safety accident from the CSM apparatus 10 (S510). After receiving the information on the occurrence possibility of safety accident, the first ESSM apparatus 40-1 may receive sensing data for the first energy source (S220), and determine whether an accident event occurs or not based on the received sensing data and the received information on occurrence possibility (S530).

Also, the first ESSM apparatus 40-1 may receive accident event related information from the other ESSM apparatuses 40-2, 40-3, ..., and 40-N (S540), and determine whether a fusion safety accident occurs or not based on the accident event related information received from the other ESSM apparatuses 40-2, 40-3, ..., and 40-N, the sensing data for the first energy source, and the received information on occurrence possibility (S550). Here, the steps S520 and S540 may be performed simultaneously.

When an accident event or a fusion safety accident event occurs, the first ESSM apparatus 40-1 may transmit information related to the accident event or the fusion safety accident event to the other ESSM apparatuses 40-2, 40-3, ..., and 40-N (S560), and transmit control signals to the first actuator 30-1 (S570). Here, the steps S560 and S570 may be performed simultaneously.

After transmitting the control signals and the information related to the accident event or the fusion safety accident event, the first ESSM apparatus 40-1 may transmit the information related to the accident event or the fusion safety accident event to the CSM apparatus 10 (S580).

Figure 6:
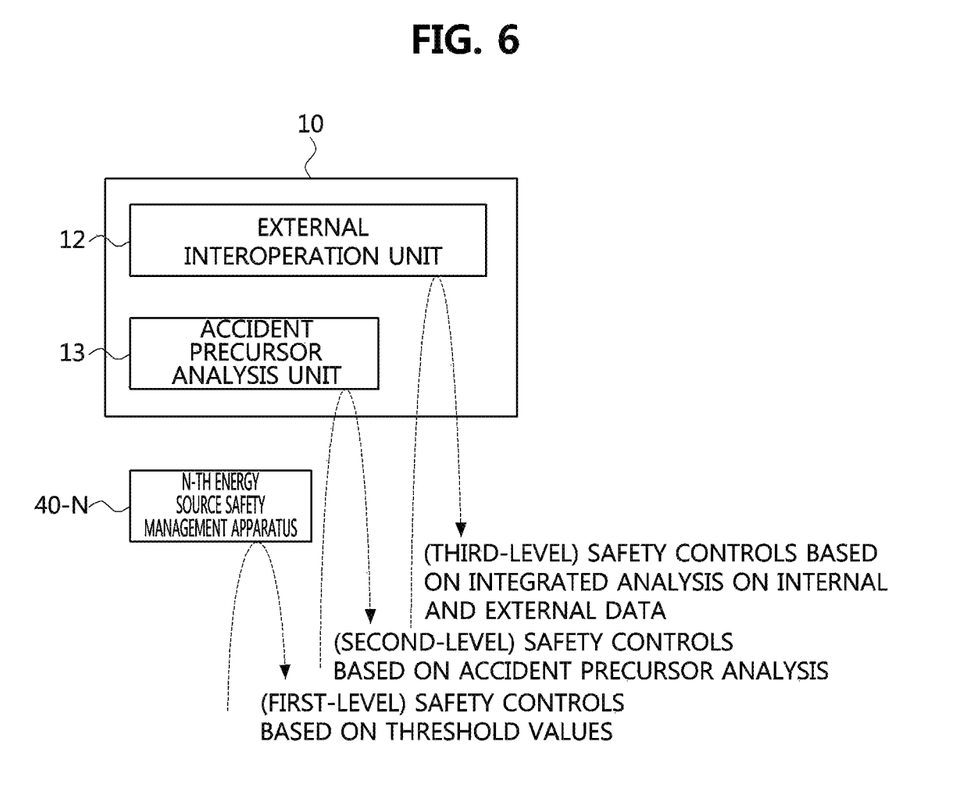
FIG. 6 is a conceptual diagram for explaining three-levels of safety controls in the energy safety management method according to embodiments of the present disclosure.

FIG. 6 is a conceptual diagram for explaining three-levels of safety controls in the energy safety management method according to embodiments of the present disclosure.

The energy safety management methods according to the embodiments of the present disclosure can provide three levels of safety controls. The configuration involved in the safety controls differs for each level, and times at which the safety controls are performed and bases on which analysis for the safety controls is performed may differ depending on the configuration for each level. The following describes a process in which the safety controls for each level are performed.

In the first level, the safety controls may be performed only within each of the ESSM apparatuses 40-1, 40-2, ..., and 40-N. The sensing unit 41 of each of the ESSM apparatuses 40-1, 40-2, ..., and 40-N may determine whether an accident event occurs or not in real time by comparing the sensing data of each energy source with the information on occurrence possibility of safety accident received from the CSM apparatus 10. Here, the information on occurrence possibility may include threshold values for the sensing data. Each of the threshold values may refer to a threshold value at which an effect appears, and may correspond to a threshold value at which a safety accident occurs in the embodiments of the present disclosure. Since each of the ESSM apparatuses 40-1, 40-2, ..., and 40-N can determine the safety accident in real time by comparing the sensing data measured by each of the sensors 20-1, 20-2, ..., and 20-N and the threshold values, the safety accident can be determined quickly according to rapid changes of the sensing data. That is, each of the ESSM apparatuses 40-1, 40-2, ..., and 40-N can perform safety management based on the threshold values and the sensing data.

In the second level, the accident precursor analysis unit 13 of the CSM apparatus 10 may be further involved to perform the safety controls. The accident precursor analysis unit 13 may receive the accident event related information from the respective ESSM apparatuses 40-1, 40-2, ..., and 40-N, and determine occurrence possibility of safety accidents based on the received accident event related information and the operation criteria established by the safety management unit 11. Also, the accident precursor analysis unit 13 may predict a time at which a safety accident is to occur, calculate a time required to prepare for the predicted safety accident, and calculate a time (e.g., golden hour) required to cope with the predicted safety accident. Here, the safety accident may include a safety accident caused by a single energy source and a fusion safety accident involving a plurality of different energy sources. Accordingly, the accident precursor analysis unit 13 can perform safety controls through the accident prediction based on the accident event related information of the respective ESSM apparatuses 40-1, 40-2, ..., and 40-N and the operation criteria of the safety management unit 11. However, the second level may be less real-time than the first level because the information gathering, analysis and determination should be performed.

In the third level, the external interoperation unit 12 of the CSM apparatus 10 may be further involved to perform the safety controls. The accident precursor analysis unit 13 may further use external data of the external interoperation unit 12 as bases for analysis of the occurrence possibility of safety accident. Here, the external data may include at least one of information on facilities related to each energy source, weather environments around the facilities, and accident histories of the facilities. Also, the external interoperation unit 12 may analyze the occurrence possibility of safety accidents by using a big-data engine based on the external data according to necessity. Accordingly, the third level may be less real-time than the second level because the safety controls are performed based on the internal data and the external data both.

Figure 7:
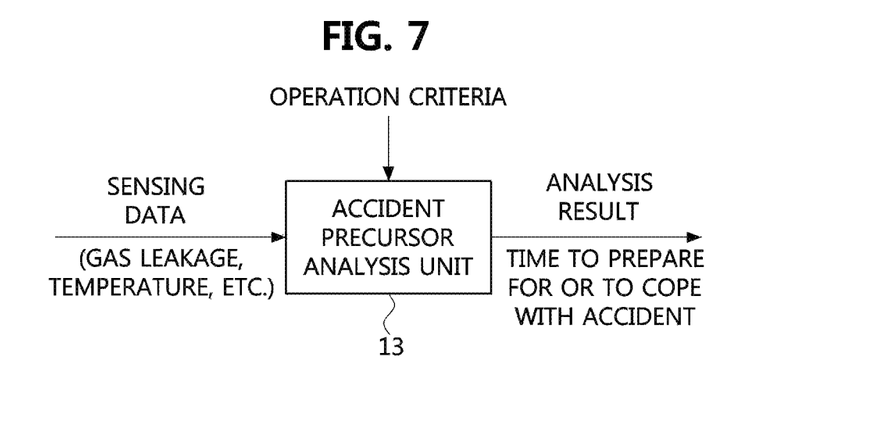
FIG. 7 is a conceptual diagram for explaining an operation of an accident precursor analysis unit according to an embodiment of the present disclosure.

FIG. 7 is a conceptual diagram for explaining an operation of an accident precursor analysis unit according to an embodiment of the present disclosure.

The accident precursor analysis unit 13 may receive sensing data from the respective ESSM apparatuses 40-1, 40-2, . . . , and 40-N, receive the operation criteria established by the safety manage unit 11 based on policies and regulations, and determine occurrence possibility of safety accidents. Also, the accident precursor analysis unit 13 may receive conditions associated with the energy resources through the operation criteria, and calculate a time required to prepare for a predicted safety accident, and calculate a time (e.g., golden hour) required to cope with the predicted safety accident. Here, the safety accident may include a safety accident caused by a single energy source and a fusion safety accident involving a plurality of different energy sources.

For example, it is assumed that the first energy source is gas energy and the second energy source is electrical energy. Under the assumption, the sensing data of the first energy source may include a value indicating the amount of gas leakage, and a temperature, a safety accident may include gas explosion, and the accident precursor analysis unit 13 may predict, as an occurrence possibility of a gas safety accident, a time to reach to a lower explosive limit due to the value of gas leakage. Here, the lower explosive limit may mean a minimum gas concentration causing an explosion, and a lower explosive limit between gas and electricity may be defined according to the operation criteria. A further detailed description will be given later with reference to FIG. 8.

Figure 8:
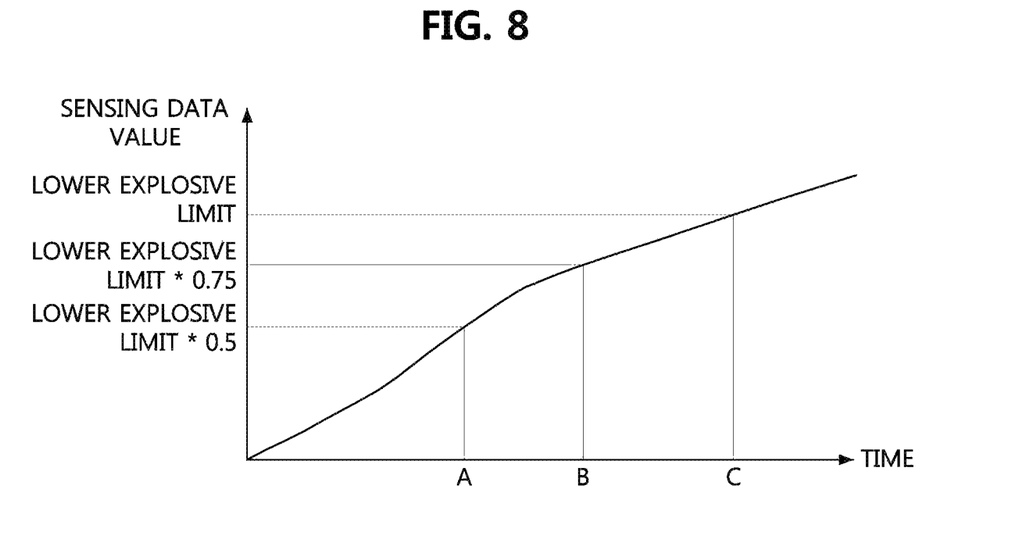
FIG. 8 is a diagram illustrating a relationship between sensing data and an estimated time at which an accident can be prevented by a safety measure according to an accidental prediction model of an accident precursor analysis unit according to an embodiment of the present disclosure.

FIG. 8 is a diagram illustrating a relationship between sensing data and an estimated time at which an accident can be prevented by a safety measure according to an accidental prediction model of an accident precursor analysis unit according to an embodiment of the present disclosure.

The accident precursor analysis unit 13 according to an embodiment of the present disclosure may predict a time when a lower explosive limit is reached as an occurrence possibility of a safety accident, and the predicted time may correspond to a time to prevent the safety accident by a safety measure. The time to reach the lower explosive limit can be calculated based on a gas leakage detection model among safety accident models. In FIG. 8, A and B may respectively indicate times to reach 50% and 75% of the lower explosive limit, and C may indicate an estimated time to reach the lower explosive limit. Here, the gas leakage detection model may vary according to characteristics of the gas such as a density of the gas and a degree of leakage of the gas.

When the gas leakage model is determined, the times such as A, B, and C can be estimated, and transmitted to the respective ESSM apparatuses 40-1, 40-2, . . . , and 40-N, and safety measures for preparing for the predicted safety accidents can be performed by the safety enforcement unit 14.

For example, when the first energy source is liquefied petroleum gas (LPG), since the an accident can be prevented by ventilation before C at which the explosion occurs, information on the occurrence possibility of safety accident can be transmitted to the ESSM apparatus of the LPG, and the ESSM apparatus of the LPG may transmit control signals to an actuator performing the ventilation. However, in a case that the ventilation is not performed or an electric factor occurs due to the ventilation, the occurrence of an accident can be prevented through a shutoff of a gas valve, so that control signals can be transmitted to the actuator that performs the shutoff of the gas valve.

The energy safety management methods according to the embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While certain aspects of the present disclosure have been described in the context of an apparatus, it may also represent an explanation according to a corresponding method, wherein the components or apparatuses correspond to the respective steps of the method and the respective features of the steps. Similarly, aspects described in the context of a method may also be represented by features of the corresponding components, items or apparatuses. Some or all of the method steps may be performed by a microprocessor, a programmable computer or a hardware apparatus such as an electronic circuit. In some embodiments, one or more of the most important method steps may be performed by such the apparatus.

In the embodiments, a programmable logic device (e.g., a field programmable gate array (FPGA)) may be used to perform some or all of the functions of the methods described herein. In the embodiments, the FPGA may operate in conjunction with a microprocessor to perform one of the methods described herein. In general, some of the methods are preferably performed by some hardware device.

While the embodiments of the present disclosure and their advantages have been described in detail, it should be understood that various changes, substitutions and alterations may be made herein without departing from the scope of the present disclosure.

What is claimed is:

1. A central safety management apparatus comprising:
a safety management unit collecting safety management policies and regulations for each of a plurality of energy sources and establishing operation criteria for each energy source;
an accident precursor analysis unit collecting accident event related information of each energy source from at least first and second energy source safety management apparatuses managing respective ones of the energy sources, and analyzing occurrence possibility of safety accidents in advance based on the accident event related information and the operation criteria; and
a safety enforcement unit transmitting a result of the analysis of the accident precursor analysis unit to the plurality of energy source safety management apparatuses, at least one of the energy source safety management apparatuses preventing the occurrence of the safety accident, wherein the operation criteria includes at least one of a plurality of factors used for determining an occurrence of a safety accident and a plurality of factors used for determining an occurrence of a fusion safety accident involving different energy sources, and wherein the accident precursor analysis unit calculates at least one of a time to prepare for a safety accident and a time to cope with the safety accident according to a type of the safety accident for each energy source.

2. The central safety management apparatus according to claim 1, further comprising an external interoperation unit collecting data related to facilities of each energy source, weather data of places where the respective facilities are located, user data of the respective facilities, and accident histories of the respective facilities, and providing the collected data to the accident precursor analysis unit.

3. The central safety management apparatus according to claim 1, wherein the accident event related information includes at least one of sensing data of an energy source and information on whether an accident event occurs.

4. The central safety management apparatus according to claim 1, wherein the operation criteria includes at least one of sensing reference values for energy sources and control reference values for energy sources.

5. The central safety management apparatus according to claim 1, wherein the safety enforcement unit transmits the time calculated by the accident precursor analysis unit to the plurality of energy source safety management apparatuses.

6. An energy source safety management apparatus, comprising:
a sensing unit determining whether an accident event occurs based on sensing data collected from a sensor of an energy source;
a control unit transmitting accident event related information to other energy source safety management apparatuses that manage another kinds of energy source for preventing an occurrence of the safety accident between energy source safety management apparatuses; and
a reporting unit transmitting the accident event related information to a central safety management apparatus,
wherein the control unit controls at least one actuator based on information about an occurrence possibility of safety accident which is transmitted from the central safety management apparatus, the information about an occurrence possibility of safety accident including at least one of a time required to cope with a predicted safety accident and a time required to prepare for a predicted safety accident.

7. The energy source safety management apparatus according to claim 6, wherein the accident event related information includes at least one of the sensing data and information on whether an accident event occurs.

8. The energy source safety management apparatus according to claim 6, wherein the sensing unit receives accident event related information of the other energy source safety management apparatuses from the other energy source safety management apparatuses, and determines whether a fusion safety accident occurs based on the sensing data and the accident event related information of the other energy source safety management apparatuses.

9. The energy source safety management apparatus according to claim 6, wherein the accident event related information of the other energy source safety management apparatuses includes at least one of sensing data of the other energy source safety management apparatuses and information on whether an accident event occurs in the other energy source safety management apparatuses.

10. The energy source safety management apparatus according to claim 6, wherein the control unit transmits control signals to an actuator of the energy source based on a result of the determination of the sensing unit.

11. An energy source safety management method of an energy source safety management apparatus, the method comprising:
determining whether an accident event occurs based on sensing data collected from a sensor of an energy source;
transmitting accident event related information to other energy source safety management apparatus for preventing an occurrence of the safety accident between energy source safety management apparatuses; and
transmitting the accident event related information to a central safety management apparatus;
wherein the energy source safety management apparatus controls at least one actuator based on information about an occurrence possibility of safety accident which is transmitted from the central safety management apparatus, the information about an occurrence possibility of safety accident including at least one of a time required to cope with a predicted safety accident and a time required to prepare for the predicted safety accident.

12. The energy source safety management method according to claim 11, wherein the information related to the accident event includes at least one of the sensing data and information on whether the accident event occurs.

13. The energy source safety management method according to claim 11, further comprising:
receiving accident event related information of the other energy source safety management apparatuses from the other energy source safety management apparatuses; and
determining whether a fusion safety accident occurs based on the sensing data and the accident event related information of the other energy source safety management apparatuses.

14. The energy source safety management method according to claim 11, wherein the information related to the accident event includes at least one of sensing data of other energy source safety management apparatus and
information on whether the accident event occurs in other the second energy source safety management apparatus.

15. The energy source safety management method according to claim 1, further comprising: transmitting control signals to an actuator according to whether the accident event occurs.

16. The energy source safety management method according to claim 13, further comprising receiving, from the central safety management apparatus, information on occurrence possibility of safety accidents obtained through analysis on received information using operation criteria established according to management policies and regulation for respective energy sources.

17. The energy source safety management method according to claim 16, further comprising transmitting control signals to an actuator according to whether the fusion safety accident event occurs.

* * * * *